(12) United States Patent (10) Patent No.: US 7,805,955 B2
Mongia (45) Date of Patent: Oct. 5, 2010

(54) USING REFRIGERATION AND HEAT PIPE FOR ELECTRONICS COOLING APPLICATIONS

(75) Inventor: Rajiv K. Mongia, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 11/618,795

(22) Filed: Dec. 30, 2006

(65) Prior Publication Data

US 2008/0156003 A1 Jul. 3, 2008

(51) Int. Cl.
*F25D 23/12* (2006.01)
(52) U.S. Cl. .................................................. 62/259.2
(58) Field of Classification Search ................ 62/259.2, 62/279, 236; 165/80.3, 104.21
See application file for complete search history.

(56) References Cited

U.S. PATENT DOCUMENTS

| | | | | |
|---|---|---|---|---|
| 6,970,355 B2* | 11/2005 | Ellsworth et al. | ............ | 361/694 |
| 6,972,365 B2* | 12/2005 | Garner | ...................... | 174/16.3 |
| 6,993,924 B2* | 2/2006 | Hsu et al. | ................... | 62/238.6 |
| 7,111,465 B2* | 9/2006 | Bell | .............................. | 62/3.7 |
| 2003/0110779 A1* | 6/2003 | Otey et al. | .................... | 62/3.2 |
| 2005/0078447 A1* | 4/2005 | Hamann et al. | ............. | 361/689 |

\* cited by examiner

*Primary Examiner*—Melvin Jones
(74) *Attorney, Agent, or Firm*—Schwabe, Williamson & Wyatt, P.C.

(57) ABSTRACT

A cooling system includes a heat pipe and a refrigerator. A combination at least one or more of the heat pipe and the refrigerator is used to cool an electronic component capable of generating heat. Depending on the cooling requirement, a different cooling combination may be used.

19 Claims, 6 Drawing Sheets

FIG. 4 ature of an event. For example, the phrase
USING REFRIGERATION AND HEAT PIPE FOR ELECTRONICS COOLING APPLICATIONS

FIELD OF THE INVENTION

The present invention generally relates to cooling systems. More specifically, the present invention relates to cooling systems that includes refrigeration to cool computer systems.

BACKGROUND

Various cooling techniques have been developed to cool heat generated by components in computer systems. These techniques may include passive cooling and active cooling. Passive cooling may include the use of a heat pipe. Active cooling may include the use of a pump and a liquid transport.

Modern electronic circuits, because of their high density and small size, often generate a substantial amount of heat. Complex integrated circuits (ICs), especially microprocessors, generate so much heat that they are often unable to operate without some sort of cooling system. Further, even if an IC is able to operate, excess heat can degrade an IC's performance and can adversely affect its reliability over time. Inadequate cooling can cause problems in central processing units (CPUs) which can result in system crashes, lockups, reboots, and other errors. The risk of such problems can become especially acute in the tight confines found inside mobile computers and other portable computing and electronic devices. Current techniques for thermal management may include the use of heat sinks, fans, and combinations of heat sinks and fans attached to ICs and other circuitry. With faster and more powerful electronic components, these techniques have been inadequate.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

For some embodiments, a cooling system may include a refrigerator and heat pipes. The cooling system may be coupled to a heat exchanger to cool electronic components in computer systems.

In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Reference in the specification to "one embodiment" or "an embodiment" of the present invention means that a particular feature, structure or characteristic described in connection with the embodiment is included in at least one embodiment of the present invention. Thus, the appearances of the phrase "for one embodiment" or "in accordance with one embodiment" or "for some embodiments" appearing in various places throughout the specification are not necessarily all referring to the same embodiment.

Computer System

Figure 1:
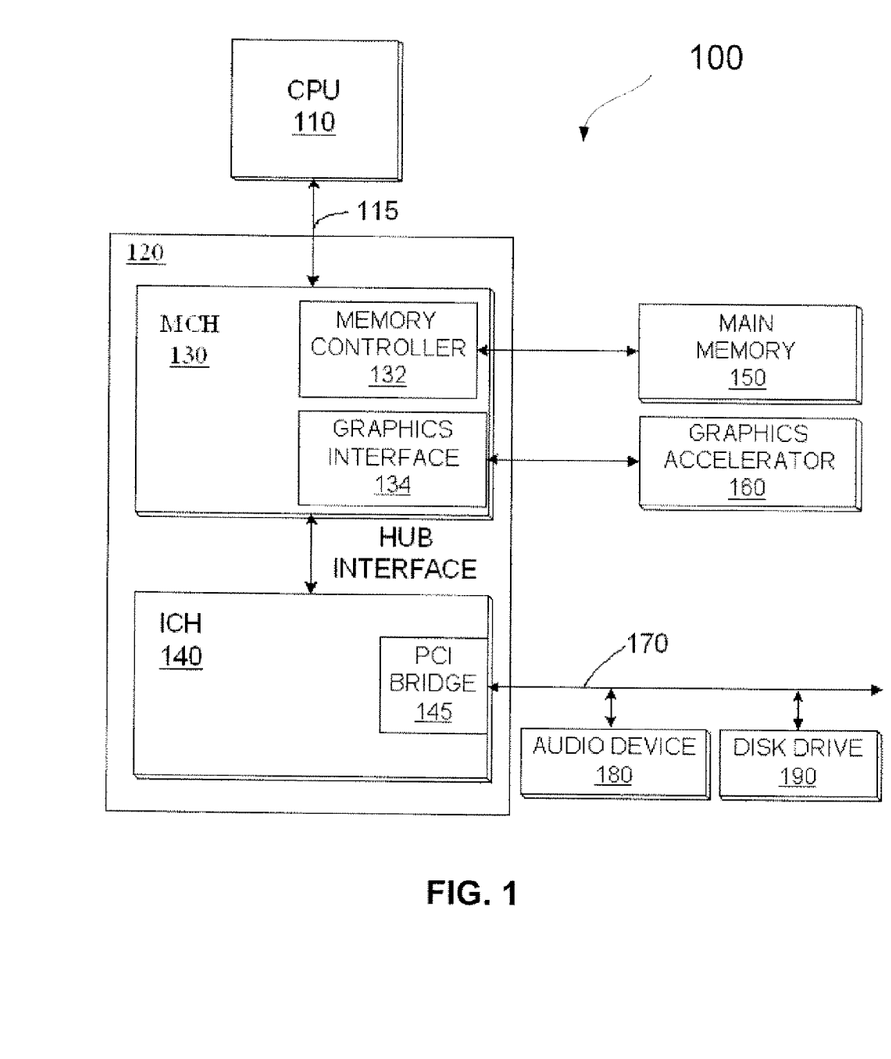
FIG. 1 is a block diagram illustrating an example of a computer system, in accordance with one embodiment.

FIG. 1 is a block diagram illustrating an example of a computer system, in accordance with one embodiment. Computer system 100 may include a central processing unit (CPU) or processor 110 coupled to a bus 115. The processor 110 may be a processor available from the Intel Corporation of Santa Clara, Calif., although processors from other manufacturers may also be used. The computer system 100 may also include a chipset 120 coupled to the bus 115. The chipset 120 may include a memory control hub (MCH) 130 and an input/output control hub (ICH) 140.

The MCH 130 may include a memory controller 132 that is coupled to a main memory 150. The main memory 150 may store data and sequences of instructions that are executed by the processor 110 or any other device included in the system. The main memory 150 may include one or more of dynamic random access memory (DRAM), read-only memory (RAM), FLASH memory, etc. The MCH 130 may also include a graphics interface 134 coupled to a graphics accelerator 160. The graphics interface 134 may be coupled to the graphics accelerator 160 via an accelerated graphics port (AGP) that operates according to an AGP Specification Revision 2.0 interface developed by the Intel Corporation. A display (not shown) may be coupled to the graphics interface 134.

The MCH 130 may be coupled to the ICH 140 via a hub interface. The ICH 140 provides an interface to input/output (I/O) devices within the computer system. The ICH 140 may be coupled to a Peripheral Component interconnect (PCI) bus. The ICH 140 may include a PCI bridge 145 that provides an interface to a PCI bus 170. The PCI Bridge 145 may provide a data path between the CPU 110 and peripheral devices such as, for example, an audio device 180 and a disk drive 190. Although not shown, other devices may also be coupled to the PCI bus 170 and the ICH 140. When the computer system 100 is in operation, each of the components mentioned above may generate heat. Cooling systems may be used to cool the components to prevent damage to the computer system 100.

Refrigeration Cooling

Figure 2A:
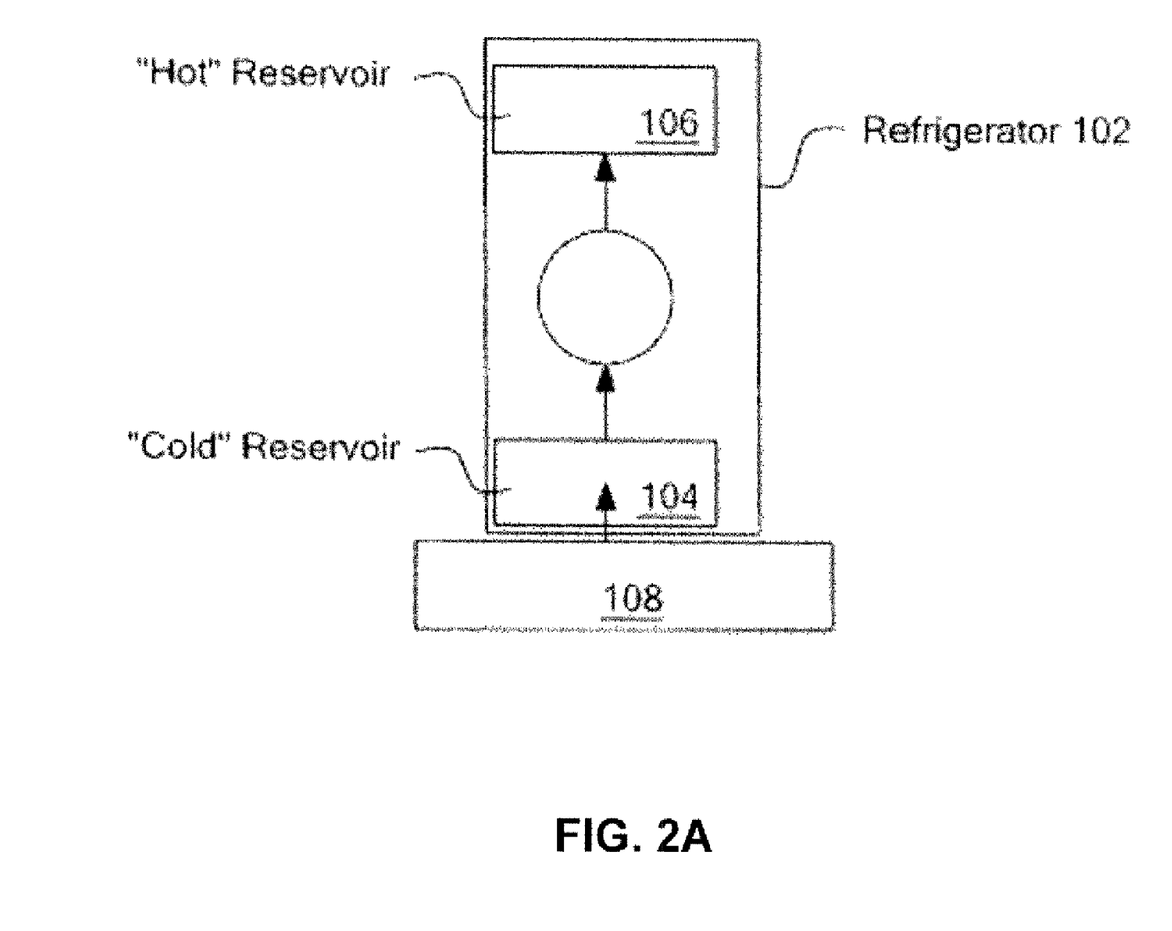
FIGS. 2A-2C illustrate examples of cooling systems that include refrigeration, in accordance with some embodiments.

FIG. 2A illustrates an example of a cooling system that includes refrigeration, in accordance with some embodiments. Refrigerator 102 may include a cold reservoir 104 and a hot reservoir 106. The cold reservoir 104 may absorb heat generated by a heat generating component 108 within the computer system 100. For example, the heat generating component 108 may include the processor 110, the chipset 120, the graphics controller 134, the memory controller 132, and other alternative heat generating components.

For some embodiments, the cold reservoir 104 may be in thermal contact with the heat generating component 108. For some embodiments, heat from the heat generating component 108 may be transferred to the cold reservoir 104 of the refrigerator 102. The heat may then be transferred to the hot reservoir 106, where the heat dissipates. For some embodiments, the refrigerator 102 may be a thermo-acoustic based refrigerator. The thermo-acoustic based refrigerator 102 may generate a standing wave by either an acoustic driver or piston. Other alternative techniques may also be used to generate the standing wave.

Figure 2B:
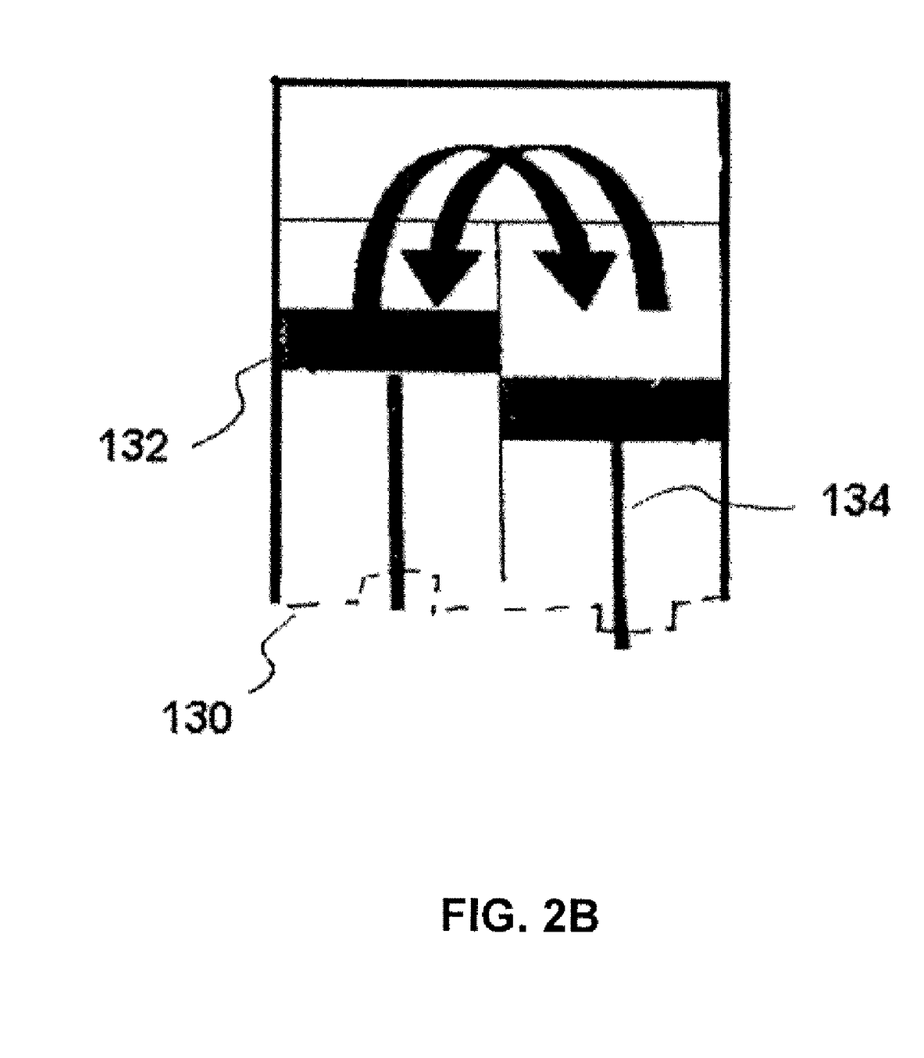

FIG. 2B illustrates one example of a refrigerator that may be used, in accordance with some embodiments. The refrigerator 102 may be a Stirling based refrigerator. A fluid may be alternatively compressed and expanded via a cranch mechanism 130 with a displacer 132 and/or piston 134, resulting in the cooling effect. The cyclical process will result in different temperatures at different point of the cycle, and therefore may be used as a refrigeration device. Other alternative Stirling configurations may be used to provide cooling.

Figure 2C:
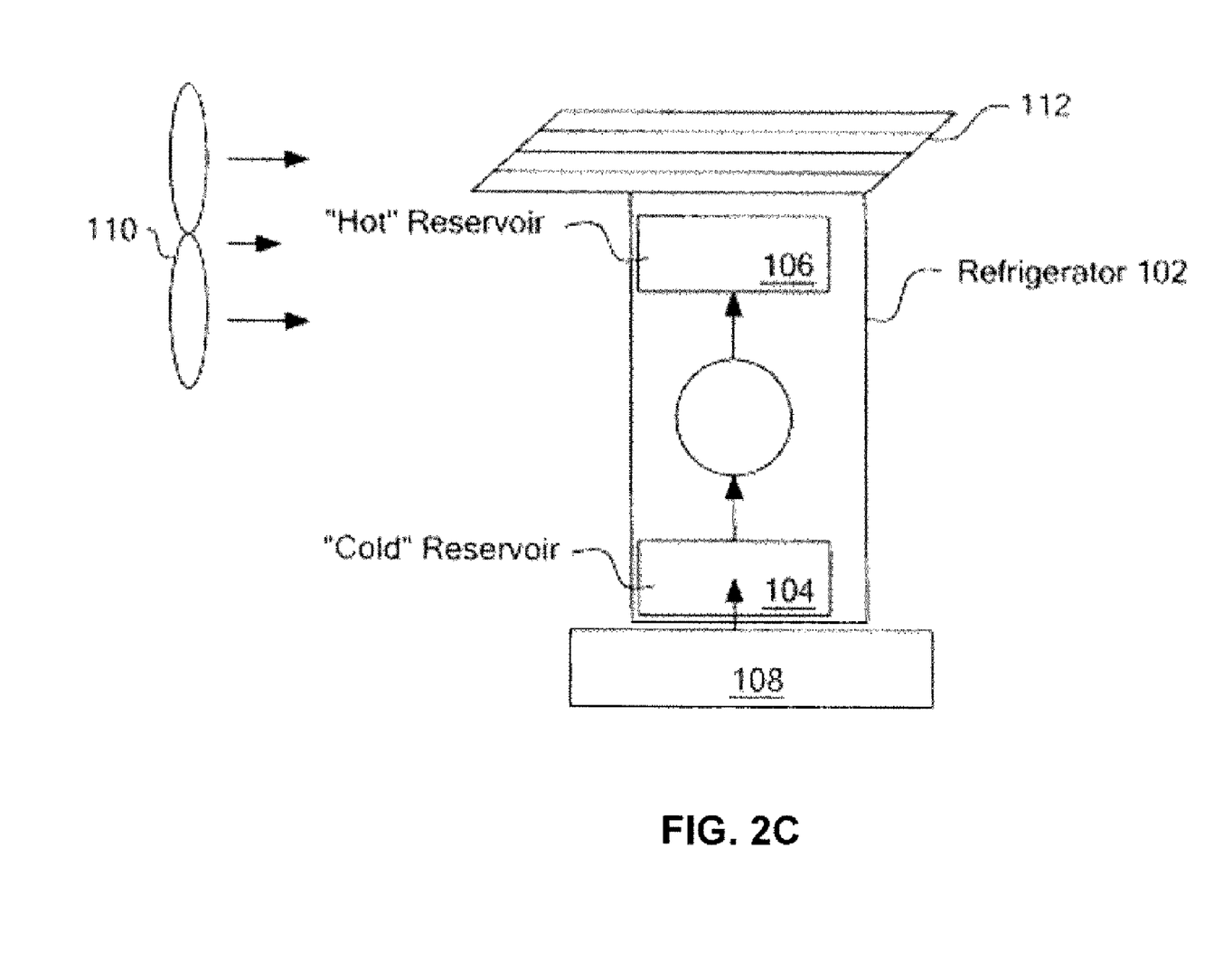

FIG. 2C illustrates one example of using a heat exchanger with the refrigerator, in accordance with some embodiments. Heat exchanger 112 may be coupled to the hot reservoir 106 of the refrigerator 102 to dissipate heat from the hot reservoir 106. For some embodiments, a heat exchanger fan 110 may be provided to supply air across the heat exchanger 112.

Refrigeration Cooling and Heat Pipe Cooling

Figure 3:
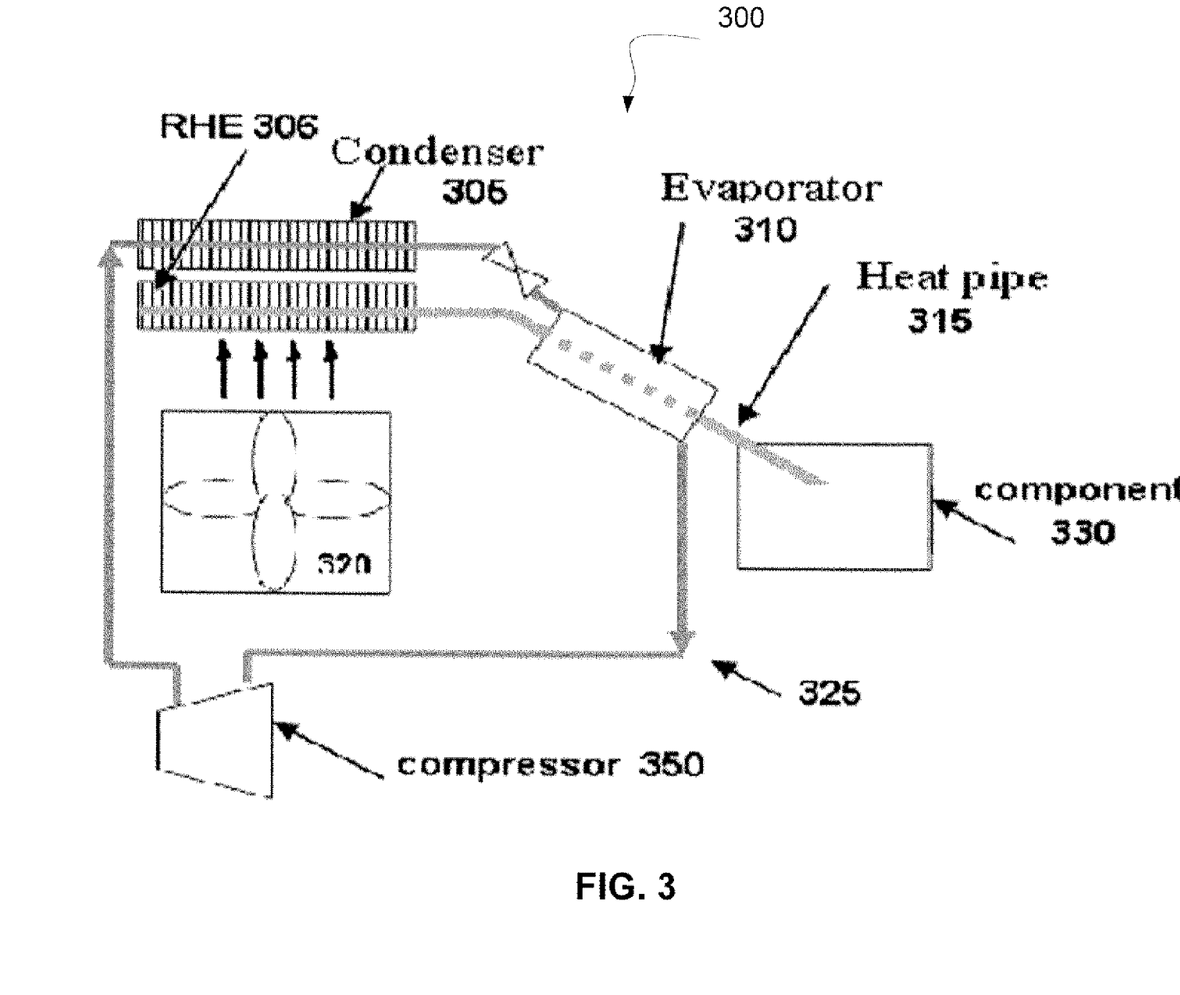
FIG. 3 illustrates an example of a cooling system having refrigeration and one or more heat pipes, in accordance with some embodiments.

FIG. 3 illustrates one example of a cooling system using refrigeration and heat pipe to cool electronic components in computer systems, in accordance with some embodiments. As illustrated, the cooling system 300 may include a refrigerator and a heat pipe 315. The refrigerator may include a compressor 350, an evaporator 310, and a condenser 305 connected together via refrigerant lines 325. The heat pipe 315 may be coupled to the heat generating component 330. For example, the heat generating component 330 may include the processor 110, the chipset 120, the graphics controller 134, the memory controller 132, and other alternative heat generating components, as illustrated in FIG. 1. The heat pipe 315 may also be connected to a remote heat exchanger (RHE) 306 which may be coupled to fan 320. The RHE 306 may dissipate heat to the air stream leaving the fan 320.

For some embodiments, the refrigerator of the cooling system 300 may be located remotely from the heat generating component 330. Alternatively, the refrigerator may be located outside the computer system 100 in a docking station, or possibly as an external module.

The evaporator 310 of the refrigerator may be in thermal contact with the heat pipe 315 leaving the component 330. The thermal contact may be made by creating coaxial chambers in which the refrigerant flows on the outer chamber and the heat pipe 315 may be contained in the inner chamber. Other alternative techniques to enable thermal contact between the evaporator 310 and the heat pipe 315 may also be used.

For some embodiments, the superheater of the refrigerator may be in thermal contact with the RHE 305. For some other embodiments, the condenser 305 of the refrigerator may also perform as a second RHE in contact with the air stream. This second RHE may be in series or in parallel to the RHE 306 attached to the heat pipe 315. For some embodiments, the two RHEs may be located on different outlets of a dual outlet fan.

For some embodiments, the refrigerator of the cooling system 300 may be turned on or off based on a certain events. These events may be based on temperature of the heat generating component 330, internal ambient temperature of the computer system 100, a level of power provided to the component 330, whether the computer system 100 is receiving power from a battery source or power from an AC outlet, or other events. These events and/or information associated with these events may be predetermined. This may enable the cooling system 300 to operate in various configurations with one or more of its component in operation to provide different cooling capacity.

For some embodiments, the cooling system 300 may operate passively with no operation of the fan 320 or the refrigerator. In this configuration, cooling of the component 330 may be accomplished by the heat pipe 315 and passive capability of the RHE 306. For some embodiments, the cooling system 300 may operate with the fan 320 in operation in conjunction with operation of the heat pipe 315 and the RHE 306.

For some embodiments, the cooling system 300 may operate with the refrigerator operating in a low load condition. In this configuration, the refrigerator may operate to cool the heat pipe 315 to a lower temperature than would normally be achieved. A portion of the heat generated by the component 330 may be dissipated by the RHE 305 and the remaining portion of the heat may be dissipated by the refrigerator. The heat dissipated by the refrigerator may be absorbed at the evaporator 310 and dissipated to the air at the condenser 305.

For some embodiments, the cooling system 300 may operate with the refrigerator operating in a high load condition. In this configuration, the refrigerator may cool the heat pipe 315 as much as possible (e.g., cool to its lowest condition). A majority of the heat generated by the component 330 may be dissipated through the refrigeration system with a small amount may be dissipated at the RHE 306.

With the cooling system 300 being able to operate in various configurations, cooling of the component 330 may be more balanced using the benefit of refrigeration in high power or thermal conditions and the benefit of the passive heat pipe cooling in low power or thermal conditions. Other advantages of the techniques described in various embodiments may include allowing for better transient operation since the superheater of the refrigeration may be removed, reducing the capacity needed for the refrigerator since some of the heat may be dissipated by the RHE 306, reducing the design complexity and/or performance requirements for the evaporator 310 and reducing the potential that operation of the component 330 may cause performance degradation to the evaporator 310 due to unbalanced heating of evaporator channels.

Process

Figure 4:
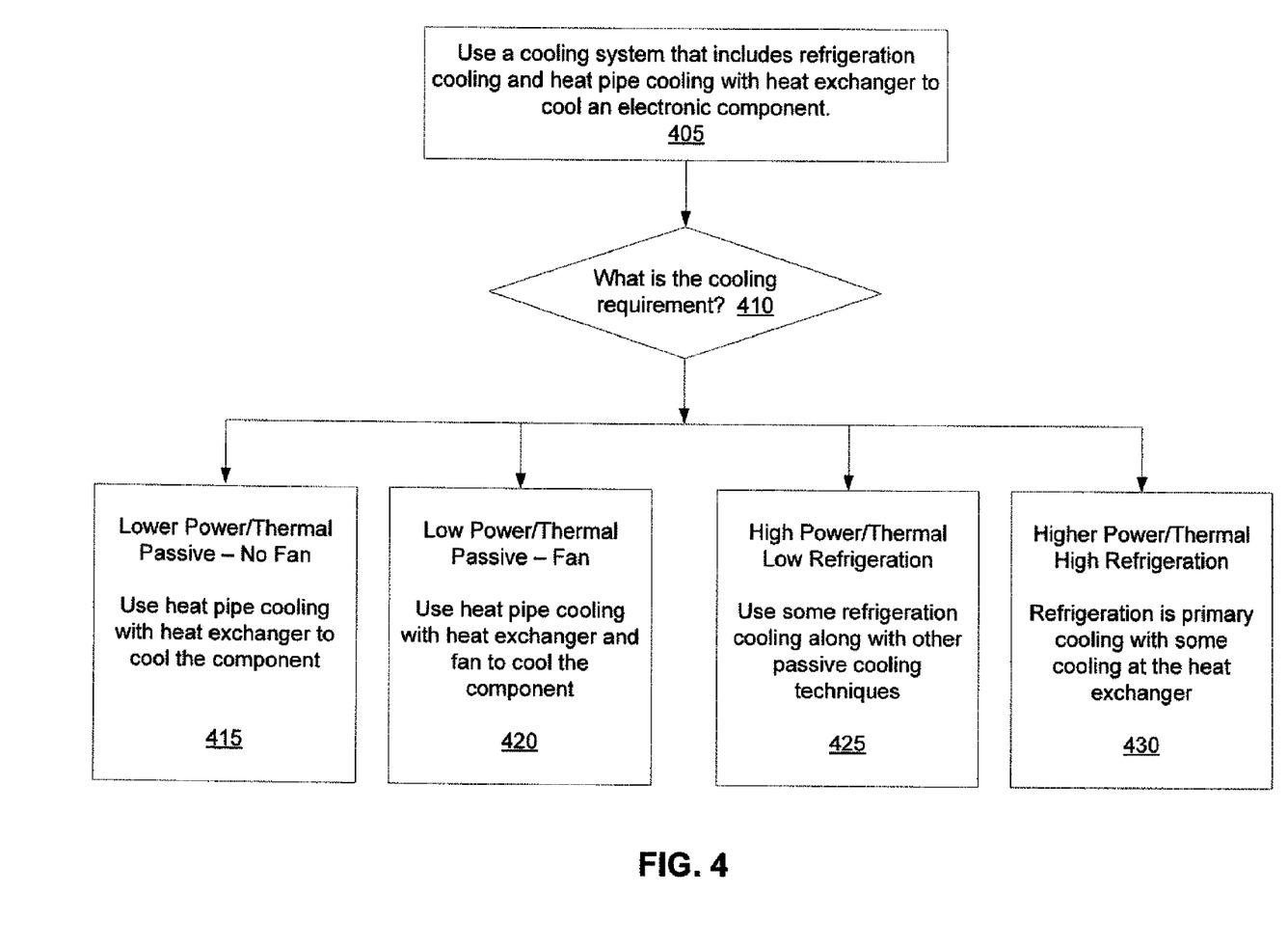
FIG. 4 illustrates a flow diagram describing an example process of using a refrigeration and heat pipes to cool electronic components in computer systems, in accordance with some embodiments.

FIG. 4 illustrates a flow diagram describing an example process of using a refrigeration and heat pipes to cool electronic components in computer systems, in accordance with some embodiments. At block 405, a cooling system that includes refrigeration cooling and heat pipe cooling is used to cool an electronic component. At block 410, a test is made to determine a type of configuration to use to cool the component. A configuration is selected depending on necessary cooling priority or cooling requirement. In high thermal or power environment, higher cooling capacity may be required. In low thermal or power environment, lower cooling capacity may be adequate.

As described above, there may be various configurations. Four of the possible configurations are described here including lower thermal/power configuration, lower thermal/power configuration, high thermal/power configuration, and higher thermal/power configuration. Each configuration may be associated with a different cooling requirement and therefore capacity provided by the cooling system. At block 415, the cooling requirement may be considered as lowest and therefore using only heat pipe cooling with the heat exchanger may be sufficient. At block 420, the cooling requirement may still be somewhat low but higher than the environment described in block 415. Here, it may be necessary to use the operation of a fan to cool heat dissipated by the heat exchanger.

At block 425, the cooling requirement may be high and the addition of refrigeration cooling may be necessary. It may be noted that, in this configuration, operation of the refrigerator in a low load may be adequate. This configuration may be considered a hybrid configuration because cooling of the component may be performed by both the refrigerator and the heat pipe with the heat exchanger and the fan. Here, it may be viewed that cooling capacity is partially provided by the refrigeration system.

At block 430, the cooling requirement may be highest and the refrigerator may take a primary role in cooling the component. Here, it may be viewed that cooling capacity is mostly provided by the refrigeration system. For example, this may include cooling the heat pipe to its lowest temperature condition. Some cooling may still be performed at the heat exchanger. It may be noted that the flow chart described herein do not necessarily imply a fixed order to the actions, and embodiments may be performed in any order that is practicable.

In the preceding description, various aspects of the present disclosure have been described. For purposes of explanation, specific numbers, systems and configurations were set forth in order to provide a thorough understanding of the present disclosure. However, it is apparent to one skilled in the art having the benefit of this disclosure that the present disclosure may be practiced without the specific details. In other instances, well-known features, components, or modules were omitted, simplified, combined, or split in order not to obscure the present disclosure.

While this disclosure has been described with reference to illustrative embodiments, this description is not intended to be construed in a limiting sense. Various modifications of the illustrative embodiments, as well as other embodiments of the disclosure, which are apparent to persons skilled in the art to which the disclosure pertains are deemed to lie within the spirit and scope of the disclosure.

What is claimed is:

1. An apparatus comprising:
    a refrigeration system including a cold reservoir and a hot reservoir, the cold reservoir being configured to absorb heat generated by a heat generating component for cooling the heat generating component; and
    a heat pipe in thermal contact with the refrigeration system and configured to thermally couple to the heat generating component for cooling the heat generating component, and wherein the apparatus is configured to apply a combination of heat pipe cooling and refrigeration cooling depending on a cooling requirement of the heat generating component.

2. An apparatus comprising:
    a refrigeration system to cool an electronic component in a computer system, the refrigeration cooling system including a condenser, an evaporator, and a compressor configured to cool the electronic component, and further including a cold reservoir and a hot reservoir, the cold reservoir to absorb heat generated by the electronic component; and
    a heat pipe coupled to the electronic component, to the refrigeration system and to a heat exchanger, wherein the heat pipe is to cool the electronic component, and wherein cooling of the electronic component is performed by at least the heat pipe and the heat exchanger.

3. An apparatus comprising:
    a refrigeration system to cool an electronic component in a computer system, the refrigeration system including a condenser, an evaporator and a compressor configured to cool the electronic component in the computer system; and
    a heat pipe coupled to the electronic component, to the refrigeration system, to a heat exchanger, and to a fan, wherein the heat pipe is to cool the electronic component, and wherein cooling of the electronic component is performed by at least the heat pipe, the heat exchanger, and the fan.

4. The apparatus of claim 3, wherein cooling of the electronic component is performed by at least the heat pipe, the heat exchanger, the fan, and the refrigeration system operating in a low refrigeration mode.

5. The apparatus of claim 4, wherein when the refrigeration system operates in the low refrigeration mode, cooling of the electronic component is partially performed by the refrigeration system.

6. The apparatus of claim 5, wherein cooling of the electronic component is performed by the heat pipe, the heat exchanger, the fan, and the refrigeration system operating in a high refrigeration mode.

7. The apparatus of claim 6, wherein when the refrigeration system operates in the low refrigeration mode, cooling of the electronic component is mostly performed by the refrigeration system.

8. A method comprising:
    cooling a component capable of generating heat using a cooling system that includes refrigeration cooling and heat pipe cooling, wherein when cooling requirement is at a first level, only heat pipe cooling is used, wherein heat pipe cooling includes cooling using a heat pipe and a heat exchanger; and
    in addition to heat pipe cooling, activating a fan coupled to the heat exchanger when the cooling requirement is at a second level, the second level associated with a higher thermal environment than the first level.

9. The method of claim 8, further comprising:
    using refrigeration cooling to cool the electronic component when the cooling requirement is at a third level, the third level associated with a higher thermal environment than the second level, wherein the refrigeration cooling is to partially cool the electronic component.

10. The method of claim 9, further comprising:
    using refrigeration cooling to cool the electronic component when the cooling requirement is at a fourth level, the fourth level associated with a higher thermal environment than the third level, wherein the refrigeration cooling is to primarily cool the electronic component.

11. A system, comprising:
    a processor;
    a heat pipe coupled to the processor to provide heat pipe cooling when the processor is to generate heat; and
    a refrigerator coupled to the heat pipe and to the processor to provide refrigeration cooling when the processor is to generate heat;

wherein depending on cooling requirement of the processor, a combination of heat pipe cooling and refrigeration cooling is applied;

wherein the heat pipe cooling is applied when there is low cooling requirement; and wherein the low cooling requirement is addressed using the heat pipe and a remote heat exchanger (RHX) coupled to the heat pipe.

12. The system of claim 11, wherein the low cooling requirement is further addressed using a fan coupled to the RHX.

13. The system of claim 12, wherein refrigeration cooling is applied when there is a high cooling requirement.

14. The system of claim 13, wherein the high cooling requirement is addressed with the refrigeration cooling partially responsible for cooling the processor along with the heat pipe cooling.

15. The system of claim 14, wherein the high cooling requirement is further addressed with the refrigeration cooling mostly responsible for cooling the processor along with some cooling of the processor provided by the heat pipe cooling.

16. The apparatus of claim 1, wherein the cold reservoir is configured to be in thermal contact with the heat generating component.

17. The apparatus of claim 1, wherein the refrigerator is a selected one of a thermo-acoustic-based refrigerator and a Stirling-based refrigerator.

18. The apparatus of claim 1, further comprising a heat exchanger coupled to the hot reservoir for dissipating heat from the hot reservoir.

19. The apparatus of claim 18, further comprising a heat exchanger fan configured to provide air across the heat exchanger.

* * * * *